Oct. 13, 1942.
A. S. HAISLIP
2,298,694
FISHING POLE HOLDER AND HARNESS THEREFOR
Filed May 23, 1940
2 Sheets-Sheet 1
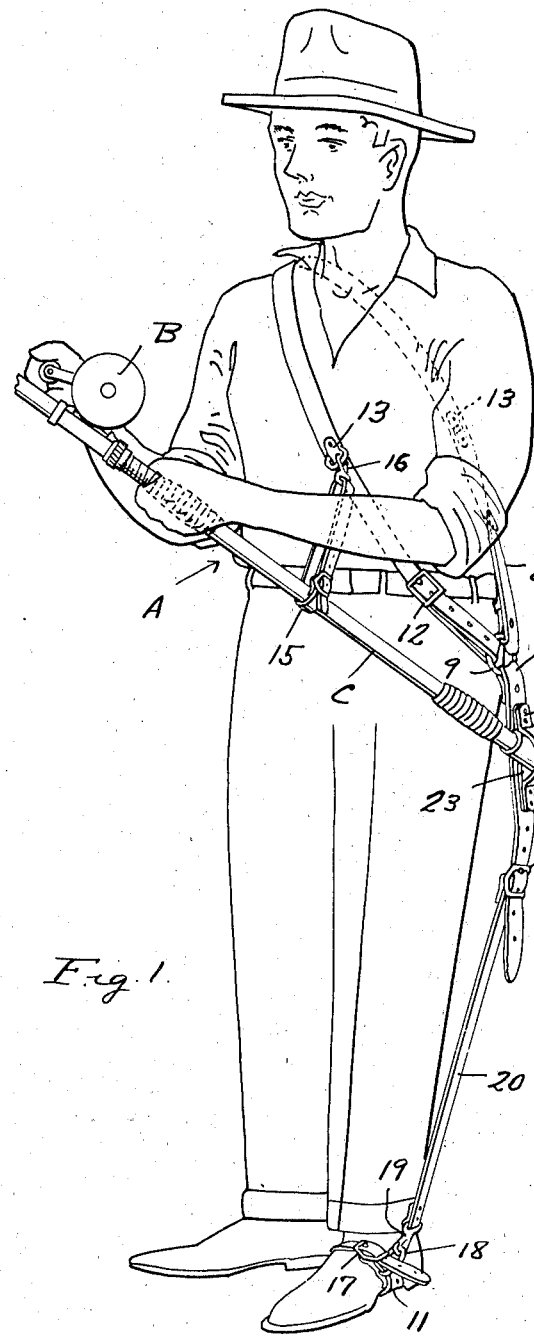
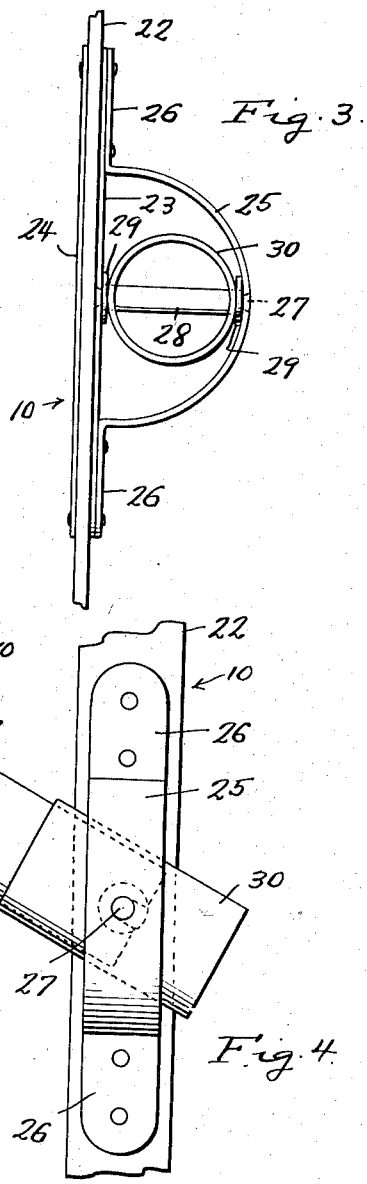
Inventor
Albert S. Haislip
By Clarence A. O'Brien
Attorneys

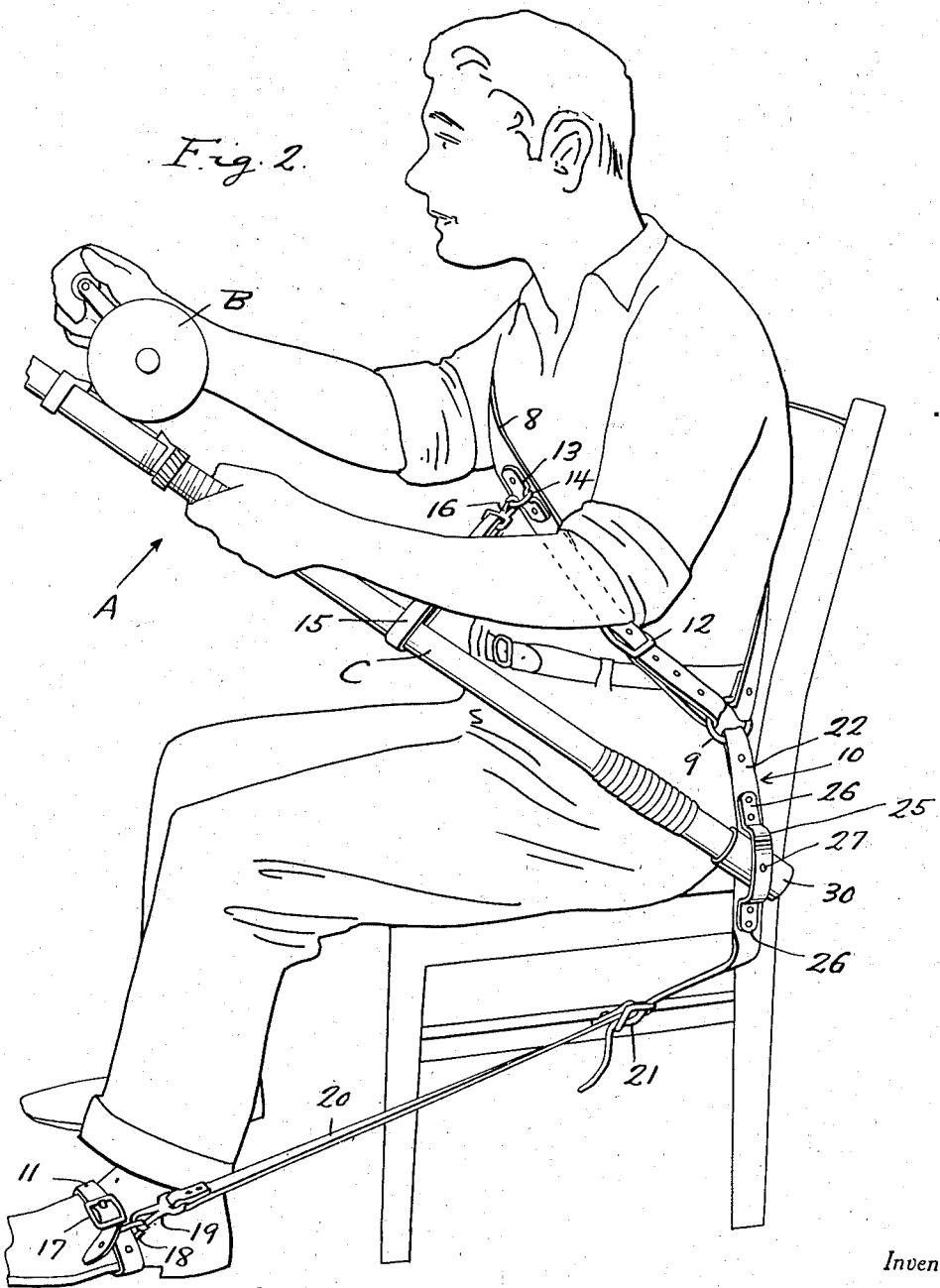

Patented Oct. 13, 1942

2,298,694

UNITED STATES PATENT OFFICE 2,298,694

FISHING POLE HOLDER AND HARNESS THEREFOR

Albert S. Haislip, Fredericksburg, Va.

Application May 23, 1940, Serial No. 336,849

6 Claims. (Cl. 224—5)

The present invention relates to a new and improved method and means of temporarily anchoring and supporting the butt end of a fishing pole, said means being incorporated in an angler's harness and the latter particularly constructed to facilitate unhampered manipulation of the pole in a manner to promote safe and sane surf casting maneuvers.

Needless to say, and as implied in the opening statement, I am aware that receptacles, sockets and the like have been employed to facilitate seating and restraining of the inner end of a fishing pole. Admittedly, therefore, the use of a belt or harness provided with a waist-line cup for the pole is broadly old. Observing, the intricacies and difficulties of the angler in properly controlling the pole during surf casting activities, I have, however, discovered certain disadvantages susceptible of appreciable improvements.

In keeping with the underlying principles of the inventive concept I have evolved a novel ways and means of seating and anchoring the elongated butt-end of the surf casting pole, whereby to dispose the point of anchorage on a plane below the belt-line of the wearer, the anchoring means being such as to permit free rise and fall of the pole and lateral angling thereof while at the same time preventing axial rotation. It is the primary purpose of this invention therefore, to provide a flexible strap harness to be worn by the angler, this characterized in particular by what may be designated as a limb regulated adapter strap, the latter having thereon the socket or other equivalent means employed for telescopically receiving and anchoring the pole-end therein.

So far as I have been able to ascertain, the use of a leg or limb strap secured at its outer end to the foot of the wearer and at its upper or inner end to a body encircling or shoulder strap, and provided with a swingable or pivoted socket or equivalent device is a novel contribution to this line of endeavor.

Other features and advantages of the invention will become more readily apparent from the following description and the accompanying illustrative drawings.

In the drawings:

Figure 1 is a perspective view of the complete contrivance, this being constructed in accordance with the principles of the present invention and being shown in use with the fisherman in a standing or erect position.

Figure 2 is a perspective view illustrating the method of use and relative position of parts when the angler is seated, as for example, on a chair or the like.

Figure 3 is an enlarged edge view of the pole-butt adapter socket and rigid metal framework utilized for attaching the socket to the associated leg or limb strap.

Figure 4 is an elevational view of Figure 3, that is, an illustration observing Figure 3 in a direction from right to left.

Figure 5 is a perspective view of the extreme inner end of the butt of the pole showing the adapter element having a kerf therein to serve as a keeper notch.

Referring now to the drawings by distinguishing reference numerals, the conventional fishing pole is denoted by the character A and the regular reel by the character B. In the drawings I have shown a regular surf-casting pole with a double hand-grip extension or butt C. Then as brought out in Figure 5, the extreme inner terminal of the butt is provided with an attachment or originally made with an adapter element 6, this having a notch or kerf 7 therein constituting a keeper seat usable in a manner to be hereinafter described.

Preparatory to describing the harness structure I desire to point out that it is of a reversible type, that is, a duplex style whereby to render it useful to both left-handed and right-handed fishermen. The harness is essentially made up of three component sections or units. First there is the body or shoulder strap 8 worn in the manner illustrated in the drawings, the converging ends thereof being provided with a ring or equivalent coupling 9 to accommodate the second section, that is, the limb or leg strap 10. The latter has detachable connection with a foot strap 11. The shoulder strap is provided with an adjusting buckle 12 and cleats 13 having eyes or rings 14 to accommodate an optionally usable stirrup accessory or strap 15. The latter is provided with a suitable snap fastener 16 to releasably engage the eye 14. In this connection, it is understood that the parts 13 and 14 are fore and aft for accommodation of the stirrup 15 so as to permit use of the latter part by left-handed and right-handed anglers.

The foot strap is of any appropriate type and provided with a buckle 17 for convenient adjustment purposes. The foot strap is also provided with an anchoring eye 18 to accommodate the snap fastener 19 on the adjacent end portion 20 of the limb or leg strap. The part 20 is joined by a buckle 21 to the companion strap section 22.

Reference being had to Figures 3 and 4 now, it will be observed that metal straps constituting reinforcing elements 23 and 24 are riveted to opposite sides of the strap section 22 at the desired elevation, generally below the waist-line of the wearer. An adapter bracket comprising a longitudinally bowed portion 25 and attaching ends 26 is secured to the plate 23. It will be noted too, that the plate 23 and arched bracket 25 serve to accommodate the reduced ends 27 of a pivot pin 28. The latter is horizontally disposed and non-rotatable. As shown it serves to accommodate end thrust or wear washers 29 and an open-ended sleeve or tube 30. The latter constitutes the anchoring socket or receptacle. It is pivoted intermediate its ends on the pivot pin 28. One end is for use by right-handed fishermen and the other end by left-handed fishermen. The pin 28 has the additional function of a detent or anchor for engagement in the keeper notch 7.

With this arrangement it is obvious that the pole, while anchored in the socket or sleeve, has free movement up and down in a vertical plane. This is permitted by the tiltable socket working on a horizontal axis. It is evident however, that the notch 7 fitting over the pin 28 prevents axial turning of the pole in the hand of the user. This, obviously, facilitates handling the pole, particularly when manipulating the reel as shown in the drawings. The twistable limb strap has sufficient flexibility as to permit sidewise switching of the pole as is necessary in surf-casting, trolling and the like. Thus, the pole is supported in the limb strap for substantially universal movement, but axial turning is at the same time substantially prevented.

I desire to stress particularly the fact that the pole socket equipped limb strap 10 is completely under the supervisory control of the wearer. It will be noted for example, in Figure 2, that while in a sitting posture, the foot may be worked back and forth to tension or loosen the limb strap, thus making it possible to maneuver and manipulate the latter to accommodate the stress and strain handling of the pole.

The reader will appreciate that although the stirrup strap 15 and the interchangeable and reversible feature thereof is important, the essence of the invention resides in the provision of a leg strap unit 10, this being anchored at one end to a body-encircling element or equivalent means and being anchored at its opposite end to the foot, ankle or leg of the user, there being on the intermediate portion thereof self-adapting and accommodating means for the pole.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. As a component part of an angler's harness construction of the class described, a longitudinally elongated flexible foot and leg articulated strap having means at its ends for attachment thereof to the body and foot respectively of the wearer, a metal frame structure on said strap intermediate its ends, a horizontal cross-pin carried by said frame structure, and an open-ended fishing pole receiving sleeve rockably mounted intermediate its ends in the frame and on said pin.

2. In a structure of the class described, a body encircling strap, a longitudinally adjustable laterally twistable limb strap connected to one end of the first named strap, means for attaching the opposite end of the limb strap to the foot of the user to facilitate loosening and tightening according to the will of said user, said limb strap serving to anchor and regulate shifting of the body encircling strap, and rod holding means mounted on the intermediate portion of said limb strap.

3. Means for accommodating and flexibly anchoring a fishing pole in a manner to control and regulate end-thrust strains and angling maneuvers while actively handling said pole comprising a flexible leg strap whose degree of flexibility is regulated by straightening or bending the leg of the wearer, means at one end thereof for securing said strap to the foot of the user, strap means for shiftably securing the opposite end of the leg strap to the body of the user, and tiltable self-levelling socket means pivoted on the leg strap to removably accommodate the butt-end of a fishing pole in the manner and for the purposes described.

4. Angler's equipage expressly designed for accommodating and flexibly anchoring a fishing pole in a manner to control and regulate and compensate for end-thrust strain and to facilitate vertical and lateral angling maneuvers while actively handling said pole comprising a longitudinally elongated strap, shoulder and body encircling means to suspend and secure the upper end of said strap to the wearer, foot embracing means to anchor the lower end of the strap upon the foot of the wearer, an adapter frame built into said strap, a horizontal pin on said frame, and a fishing pole having an adapter member on one end thereof provided with a keeper notch releasably engageable with said pin.

5. In an angler's harness structure of the class described, a flexible axially twistable strap adapted to occupy a vertically extending position ordinarily alongside the leg of the user, the fishing pole controlling and regulating movement and shifting of said strap being voluntarily controlled by the shifting of the leg and foot of said user, body and shoulder embracing means for suspending and attaching the upper end of the strap to the upper or body portion of the user, foot encircling means for attaching the lower end of the strap to the foot of the user, a substantially horizontal pin rigidly mounted on the intermediate portion of said strap, a fishing pole receiving and accommodating socket rockably mounted on said pin, said socket being adapted to slidably and removably receive the butt end of the pole, and said pin functioning as a detent for the adjacent butt end of the pole.

6. In an end-thrust resisting as well as stress and strain compensating fishing pole holder and handling device of the class described, a shoulder and body embracing member, a flexible axially twistable leg strap attached at its upper end to said member, means for adjustably and releasably attaching the lower end of said leg strap to the foot of the user, rod holding and anchoring means mounted on said leg strap at a point below the belt line of the user, and a pole suspending and sustaining stirrup-like loop attached to said member at a predetermined point and disposed in complemental alignment with said anchoring means, said loop being freely hung for pendulous swinging action, whereby to coordinate and combine the force and effect of the loop and said anchoring means, in supporting, manipulating and controlling the pole for surf casting and/or trolling as the case may be.

ALBERT S. HAISLIP.